US010312998B2

(12) United States Patent
Goodzeit et al.

(10) Patent No.: US 10,312,998 B2
(45) Date of Patent: Jun. 4, 2019

(54) HYBRID COMMUNICATIONS ASSEMBLY FOR SPACECRAFT

(71) Applicant: LOCKHEED MARTIN CORPORATION, Bethesda, MD (US)

(72) Inventors: Neil E. Goodzeit, Woodside, CA (US); Craig Edward Jones, Mountain View, CA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 734 days.

(21) Appl. No.: 14/864,698

(22) Filed: Sep. 24, 2015

(65) Prior Publication Data

US 2017/0093483 A1 Mar. 30, 2017

(51) Int. Cl.
*B64G 1/22* (2006.01)
*H04B 7/185* (2006.01)
*B64G 1/10* (2006.01)
*B64G 1/44* (2006.01)
*B64G 1/58* (2006.01)
*H04B 10/112* (2013.01)

(52) U.S. Cl.
CPC ....... *H04B 7/18515* (2013.01); *B64G 1/1007* (2013.01); *B64G 1/222* (2013.01); *B64G 1/443* (2013.01); *B64G 1/58* (2013.01); *H04B 10/112* (2013.01)

(58) Field of Classification Search
CPC .................................................. B64G 1/1007
See application file for complete search history.

(56) References Cited

U.S. PATENT DOCUMENTS

| 4,030,047 A | * | 6/1977 | Fletcher | G02B 7/008 |
| | | | | 359/820 |
| 5,253,944 A | * | 10/1993 | Preston | B64G 1/646 |
| | | | | 244/173.3 |
| 6,522,440 B1 | * | 2/2003 | Poon | H04B 10/118 |
| | | | | 398/103 |

(Continued)

OTHER PUBLICATIONS

Witting, et al., "Status of the European Data Relay Satellite System", Proc. International Conference on Space Optical Systems and Applications (ICSOS), Oct. 2012, 8 pgs.

(Continued)

*Primary Examiner* — Brian M O'Hara
*Assistant Examiner* — Michael B Kreiner
(74) *Attorney, Agent, or Firm* — McDermott Will & Emery LLP

(57) ABSTRACT

A hybrid communications assembly for a spacecraft is provided. The hybrid communications assembly may include an assembly base, one or more laser communications terminals mounted on the assembly base, and a radio frequency antenna system mounted on the assembly base. The assembly may be mounted on an earth deck of the spacecraft, and the laser communications terminals may be mounted at an angle between 20 and 70 degrees with respect to the earth deck. A thermal radiator may be mounted on the assembly base and thermally coupled to the laser communications terminal. The radio frequency antenna system may be disposed between the laser communications terminals. The radio frequency antenna system may include one or more antenna reflectors mounted on the assembly base and one or more antenna feeds mounted on a tower.

6 Claims, 9 Drawing Sheets

(56) References Cited

U.S. PATENT DOCUMENTS

| | | | |
|---|---|---|---|
| 7,532,819 B1* | 5/2009 | Triebes | H04B 10/118 398/121 |
| 8,094,081 B1* | 1/2012 | Bruzzi | H01Q 13/0208 343/725 |
| 9,042,734 B2* | 5/2015 | Makowski | H04B 10/11 398/118 |
| 9,240,841 B2* | 1/2016 | Chorvalli | H04B 10/118 |
| 2004/0258415 A1* | 12/2004 | Boone | H04B 10/1125 398/125 |
| 2017/0026121 A1* | 1/2017 | Everett | H04B 10/118 |
| 2017/0026122 A1* | 1/2017 | Everett | H04B 10/118 |

OTHER PUBLICATIONS

Boucher, "MDA to Provide Subsystem for the European Data Relay Satellite C", retrieved from <http://spaceref.ca/commercial-space/mda/mda-to-provide-subsystem-for-the-european-data-relay-satellite-c.html>, Jan. 7, 2014, 3 pgs.

* cited by examiner

HYBRID COMMUNICATIONS ASSEMBLY FOR SPACECRAFT

STATEMENT REGARDING FEDERALLY SPONSORED RESEARCH OR DEVELOPMENT

Not applicable.

FIELD

The present disclosure generally relates to communications assemblies and spacecraft and in particular to, for example, a hybrid communications assembly for a spacecraft.

BACKGROUND

Future geo-synchronous earth-orbit (GEO) communications payloads may include laser communications terminals (LCTs) for gigabit-per-sec point-to-point data transmission. LCTs can support bi-directional connections to low-earth orbit (LEO) spacecraft, GEO spacecraft, airborne vehicles, or ground terminals. Although LCTs offer advantages for many applications, a principle drawback is that laser beam transmission is sensitive to atmospheric conditions (e.g., clouds/weather), making ground communications using LCTs unreliable. Also, LCTs cannot provide the broad geographic or multiple spot-beam coverages needed for typical communications missions. It would therefore be desirable to be able to provide improved communications systems for a spacecraft that include LCT technology.

The description provided in the background section should not be assumed to be prior art merely because it is mentioned in or associated with the background section. The background section may include information that describes one or more aspects of the subject technology.

SUMMARY

In one or more implementations, a hybrid communications assembly for a spacecraft includes an assembly base configured to attach to an earth deck of the spacecraft. The assembly base may include one or more angled surfaces, where each of the one or more angled surfaces is disposed at an angle between 20 degrees and 70 degrees with respect to the earth deck. The assembly may also include at least one laser communications terminal mounted on one of the one or more angled surfaces of the assembly base and at least one radio frequency antenna system mounted to the assembly base.

In one or more implementations, a communications assembly for a spacecraft is provided. The assembly may include an assembly base configured to attach to the spacecraft, a laser communications terminal mounted to the assembly base, and a radio frequency antenna system mounted to the assembly base. The assembly may also include a thermal radiator mounted to the assembly base and thermally coupled to the laser communications terminal.

In one or more implementations, a spacecraft includes a body having an earth deck. The spacecraft also includes a hybrid communications assembly mounted to the earth deck. The hybrid communications assembly may include an assembly base and one or more laser communications terminals mounted to the assembly base, where each of the one or more laser communications terminals is mounted at an angle with respect to the earth deck. The assembly may also include a radio frequency antenna system having a deployable antenna reflector, where the deployable antenna reflector is mounted to the assembly base.

It is to be understood that both the foregoing general description and the following detailed description are exemplary and explanatory and are intended to provide further explanation of the subject technology as claimed. It is also to be understood that other aspects may be utilized and changes may be made without departing from the scope of the subject technology.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
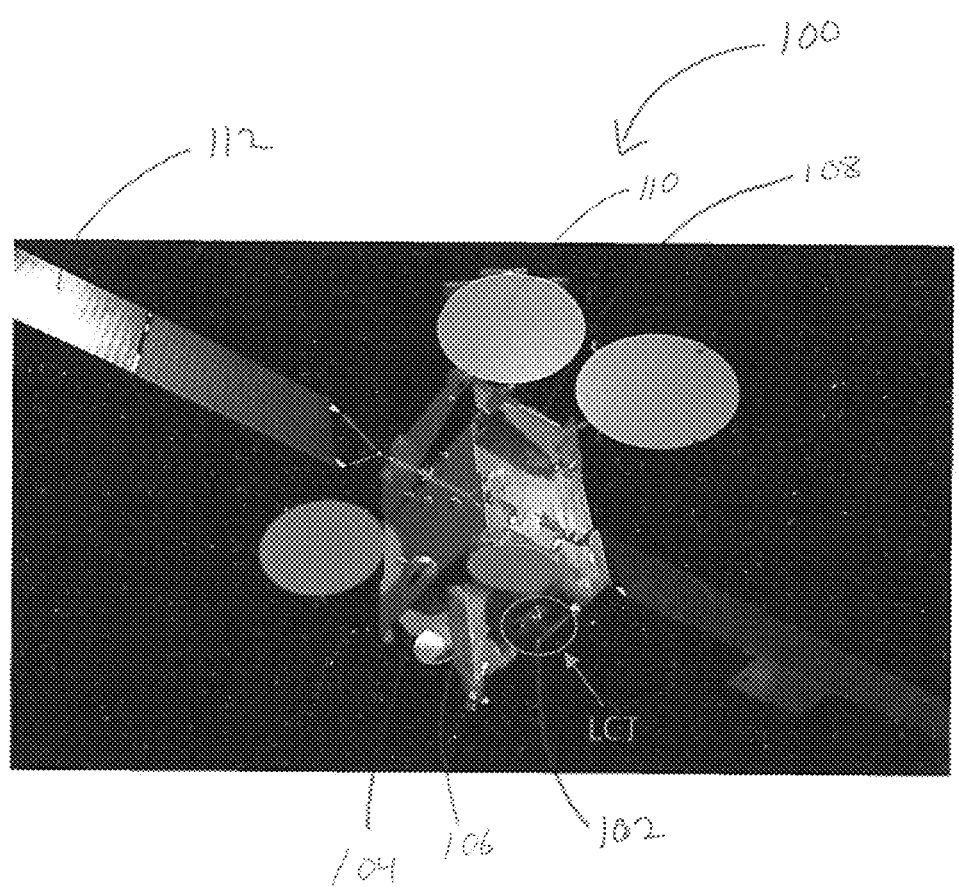
FIG. 1 illustrates an example of a geo-synchronous earth-orbit (GEO) spacecraft with a laser communications terminal (LCT).

FIG. 1 shows an example of a GEO spacecraft 100 including an LCT 102. The LCT 102 is placed on the earth deck 104 alongside standard RF antennas 106. Additional components such as antenna systems 110 and solar panels 112 may be mounted to the sides of the body 108 of the spacecraft. There are several drawbacks to this arrangement. First, many applications require several LCTs capable of pointing in earth, east, and west directions, making field of view (FOV) accommodation difficult. Second, LCTs may require large thermal radiators, as well as star trackers, and inertial measurement units (IMUs). The need for these items limits the mounting area available for RF antennas and exacerbates the FOV problem. Finally, the illustrated arrangement of FIG. 1 involves multiple units separately integrated into the spacecraft. It is more desirable to have a single assembly to reduce spacecraft integration and test time.

One or more aspects of the present disclosure solve the problems described above by providing an integrated assembly, sometimes referred to herein as a hybrid communications assembly, that supports both LCTs, with components such as their attitude sensors and thermal radiators, as well as RF antennas.

In one or more implementations, an integrated assembly for a GEO spacecraft may be provided that supports both laser communications terminals (LCTs) and RF antennas. An RF antenna tower may be sandwiched between two LCTs that are structurally coupled. The integrated assembly accommodates large aperture antennas and LCTs such that earth-facing and cross-link FOVs are satisfied. The design also provides a dynamically stable mounting that aids motion cancellation and jitter mitigation. There are cost and schedule advantages to an integrated design such as this that reuses common elements for multiple applications.

The integrated assembly may be implemented, for example, in a spacecraft such as a future A2100TR spacecraft and comprises an integrated assembly including LCTs and RF antennas that mounts to the spacecraft earth deck. This integrated assembly approach satisfies LCT requirements for precision attitude knowledge, low jitter, and thermal control, as well as line-of-sight viewing in the earth, east, and west directions. The assembly also supports multiple RF antennas, including offset-fed and folded-optics designs, in a way that is fully compatible with the LCTs.

In one or more aspects, a hybrid communications assembly of the present disclosure provides the following advantages: (a) a single assembly that satisfies field-of view requirements for LCTs and RF antennas, and is optimized for efficient use of valuable earth-deck-mounting area, (b) an arrangement that satisfies LCT requirements for precision attitude knowledge, low jitter, and thermal control, and (c) an assembly that may be integrated and tested as a single unit, reducing spacecraft integration and test time and cost.

Figures 2A, 2B:
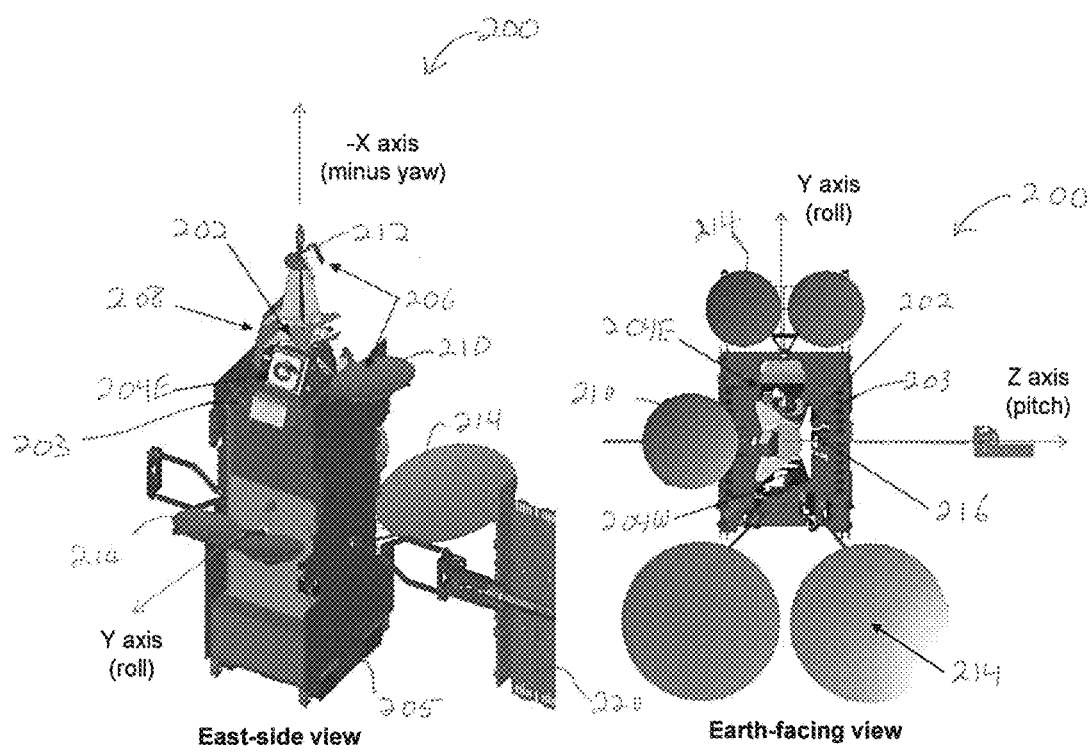
FIGS. 2A and 2B illustrate various views of an example of a GEO spacecraft with a hybrid communications assembly.

FIGS. 2A and 2B illustrate various views of an example of a GEO spacecraft with a hybrid communications assembly. In this regard, FIG. 2A shows an example of a perspective view (denoted as an "East-side view") of a spacecraft 200 with a hybrid communications assembly 202 (which is sometimes referred to as an assembly for brevity). FIG. 2B shows an example of a top view (denoted as an "Earth-facing view") of the spacecraft 200 with the hybrid communications assembly 202.

Referring to FIGS. 2A and 2B, the assembly 202 includes two LCTs 204E and 204W and an RF antenna system 206 in a self-compatible arrangement that satisfies FOV requirements. The RF antenna system 206 may include one or more antenna reflectors such as a reflector 210 and one or more antenna feed assemblies such as a feed assembly 212. Note that a reflector may be sometimes referred to as an RF antenna reflector, an antenna reflector, an antenna, an RF antenna, or vice versa for convenience. An RF antenna system may be sometimes referred to as an RF antenna(s), an antenna(s), or vice versa for convenience.

The assembly 202 is mounted to a spacecraft earth deck 203, and the figures show the spacecraft body axes of the spacecraft body 205, where in GEO orbit the velocity vector is aligned with the Y axis (roll), the orbit normal is aligned with the Z axis (pitch), and the minus-X axis (minus yaw) is directed toward the Earth. The LCTs 204E and 204W are integrated into the base of the assembly 202. An east LCT 204E may include a rotatable optical port for viewing in the earth and east directions and a west LCT 204W may include a rotatable optical port for viewing in the earth and west directions. An LCT mounting interface, described in further detail hereinafter, is provided such that the LCT normal vectors (normal to the mounting interface) are parallel to the spacecraft X/Y (yaw/roll) plane. LCT pointing components 216 (e.g., star trackers and an IMU) that provide the LCT pointing reference are located on the north side of the assembly between the LCTs in the example shown. Also included is a radiator 208 coupled to both LCTs 204E and 204W for temperature control. Note that the designation of north, south, east, and west is arbitrary and the assembly can be rotated 180 degrees about the yaw axis without functional impact.

In the example shown in FIGS. 2A and 2B, the RF antenna system 206 with a single aperture is mounted to the south side of the assembly. Other configurations are possible with multiple antennas mounted to the assembly. Also, separate antennas 214 may be mounted to the spacecraft body 205 on either the east or west sides. As shown, one or more solar panels 220 may be mounted to the spacecraft body 205 (e.g., on the north and/or south sides).

Figures 3A, 3B:
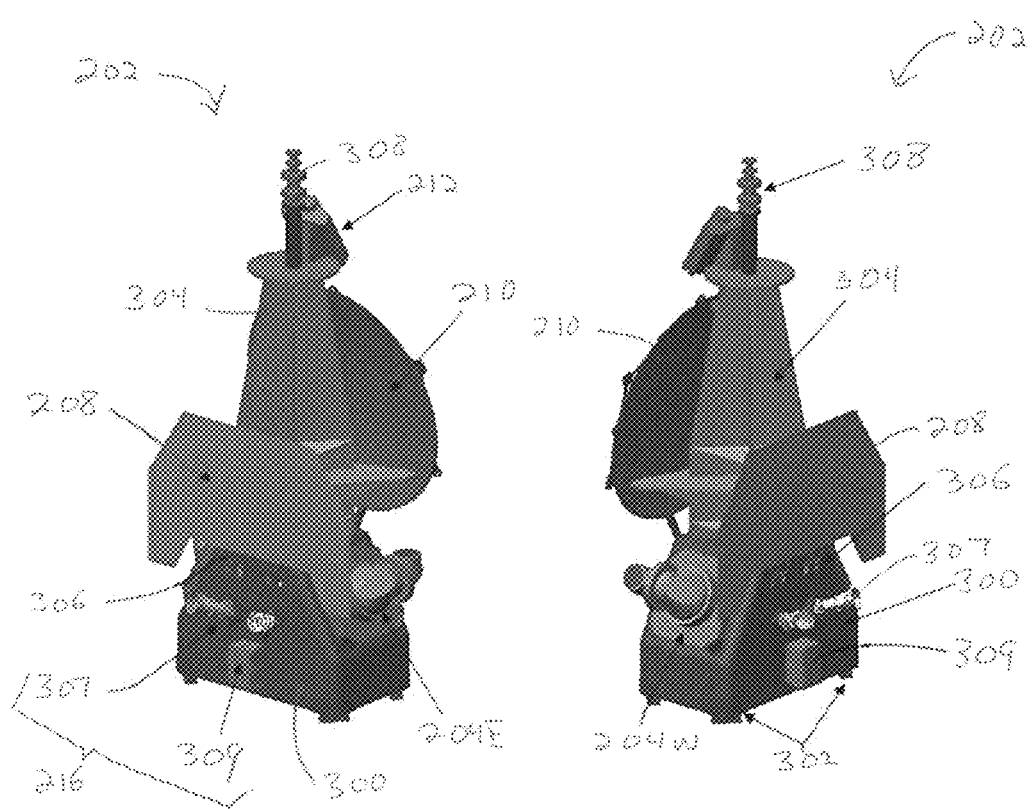
FIGS. 3A and 3B illustrate various views of an example of a hybrid communications assembly.

FIGS. 3A and 3B illustrate examples of two perspective views of the assembly 202 with its constituent elements. In one or more implementations, an assembly base 300 is a thermally stable composite structure that interfaces to the spacecraft earth deck via mounting feet 302 and supports the LCTs 204E and 204W and one or more RF antennas 210. A tower assembly 304 is attached to the base 300, and the tower assembly 304 provides the metering structure for the antennas and is sufficiently tall to achieve the necessary F/Ds (antenna focal length divided by aperture diameter) for operation of the RF antennas. A tower assembly may be sometimes referred to as an antenna tower, a tower, or vice versa for convenience. The base 300 includes star trackers 307 and an IMU 309 located between the LCTs 204E and 204W for close mechanical coupling to both LCT mounting interfaces. The star trackers 307 provide the pointing reference for LCT link acquisition, and the IMU 309 provides data for LCT line-of-sight compensation. One or more additional communications components such as a telemetry, tracking and command (TT&C) antenna 308 may also be provided on the tower 304 in some implementations.

Still referring to FIGS. 3A and 3B, attached to the base 300 is the thermal radiator 208, which faces North to limit sun exposure. With the dedicated radiator 208, the assembly 202 is thermally independent of the spacecraft main body 205 and therefore testable as a unit. In one aspect, this approach is preferred versus alternatives that thermally connect the LCTs to the spacecraft north or south equipment panels. This later approach reduces the radiator area available for high dissipation equipment such as output multiplexers that are best located close to the earth deck and antenna feeds.

The surface of the radiator 208 may include an optical solar reflector (OSR) to reflect incident solar radiation and provide high emissivity. The radiator 208 is sized to provide an LCT interface temperature of about 25 degree C. For an LCT thermal dissipation of about 150 to 170 Watts, the corresponding radiator area (see RA in FIG. 8B) would be about 1.4 m². Additional area may be provided for radiator 208 by increasing the radiator height and width. This excess area may be used to reduce the LCT temperatures, thereby improving reliability, or to support RF components mounted on the tower assembly, such as low noise amplifiers (LNAs) or receivers. The radiator 208 is attached via heat pipes 306 to a cold plate (not visible in FIGS. 3A and 3B) inside the assembly base 300 that connects to the LCTs 204E and 204W via flexible heat pipes or other thermal conductive structures.

Figure 4:
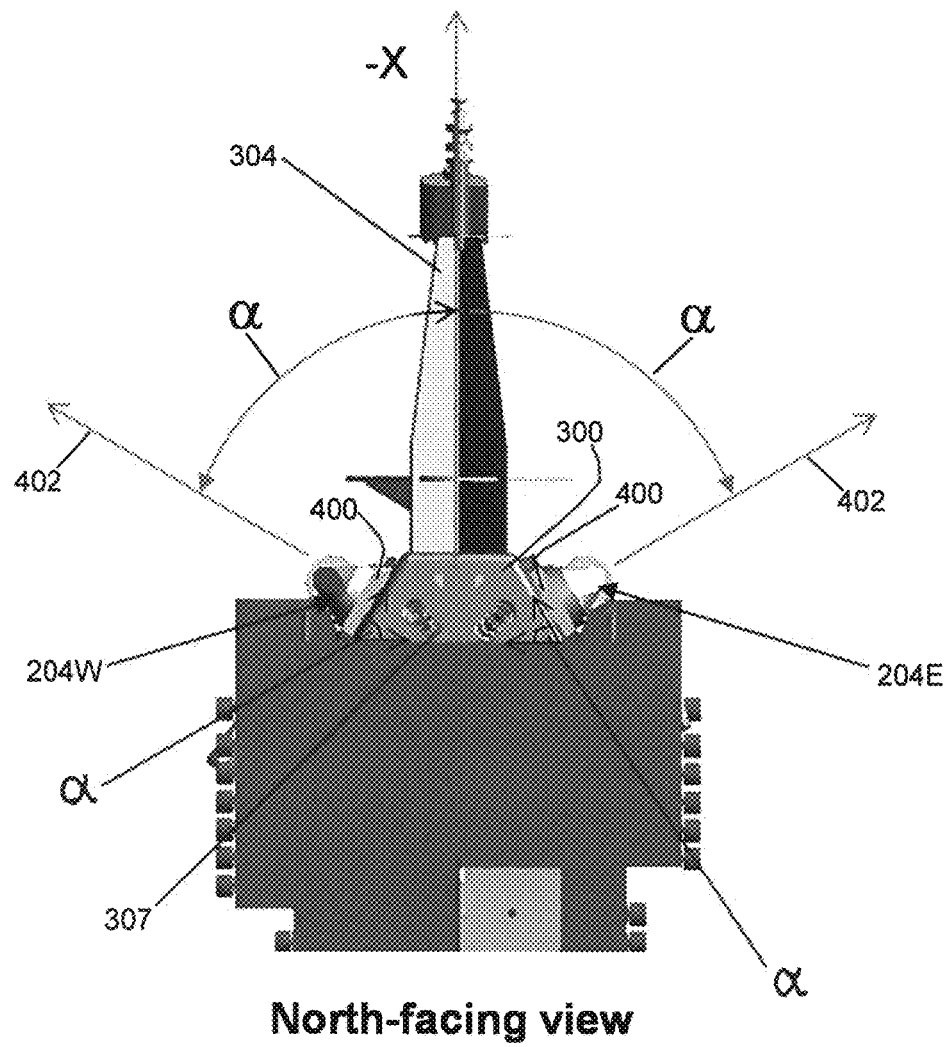
FIG. 4 illustrates an example of a hybrid communications assembly showing LCT mounting angles.

As shown in FIG. 4, the assembly base 300 is configured such that a given LCT mounting angle alpha (α) may be achieved. The angle α may be an angle between the minus-X ("−X") axis and a perpendicular bisector 402 of an LCT base 400 mounted to the assembly base 300. In this regard, the angle α may be described as an angle between the LCT base 400 and the earth deck 203 (e.g., an angle α of zero degrees would indicate an LCT base mounted parallel to the earth deck, and an angle α of ninety degrees would indicate an LCT base mounted perpendicular to the earth deck). In one implementation, the angle α is 60 degrees from the minus-X axis. In one aspect, the angle α selected depends on the range over which the LCT pointing must vary to meet mission requirements. Larger angles may be favored for crosslink missions, whereas LEO spacecraft data relay missions may use smaller angles. In one or more aspects, the angle α may vary between 20 degrees and 70 degrees. In one aspect, the angle α may be between 30 degrees and 70 degrees. In another aspect, the angle α may be between 40 degrees and 60 degrees. In one aspect, the angle α is not 0 degrees, and the angle α is not 90 degrees. In one aspect, an angle α for the LCT 204E and an angle α for the LCT 204W may be the same. In another aspect, an angle α for the LCT 204E and an angle α for the LCT 204W may be different.

Figure 5:
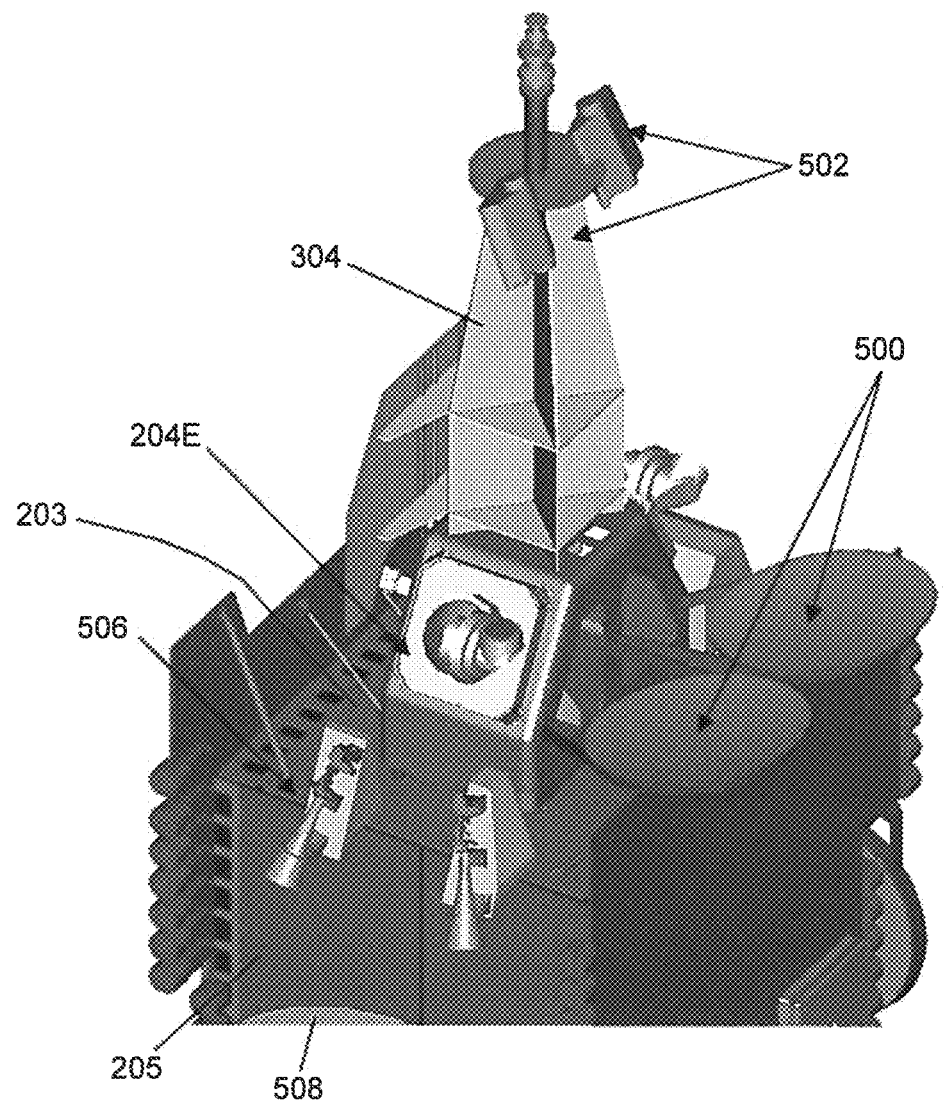
FIG. 5 illustrates an example of a hybrid communications assembly with multiple radio frequency (RF) antennas.

In one or more implementations, various RF antenna arrangements are possible. The implementations shown in FIGS. 2A, 2B, 3A, and 3B include an offset fed antenna system with a multi-beam feed array. For the RF antenna system 206, the reflector diameter may be, for example, approximately 1.5 m, and the focal length may be, for example, about 2.5 m, and hence the F/D may be about 1.6. Other arrangements may include antennas with aperture sizes from about 0.5 m to 2 m with either offset or folded optics designs. For example, FIG. 5 shows an implementation that includes two offset-fed antennas with aperture size of 0.9 m and F/D of 2.4. As shown, two antenna feeds 502 may be positioned on the tower assembly 304 to receive signals from two corresponding reflectors 500 of the two offset-fed antennas. FIG. 5 also shows optional additional antenna feeds 506 that are mounted to the earth deck 203 (instead of the assembly 202) and positioned to receive signals from corresponding reflectors 508 mounted to the side of the spacecraft body 205.

Figures 6A, 6B:
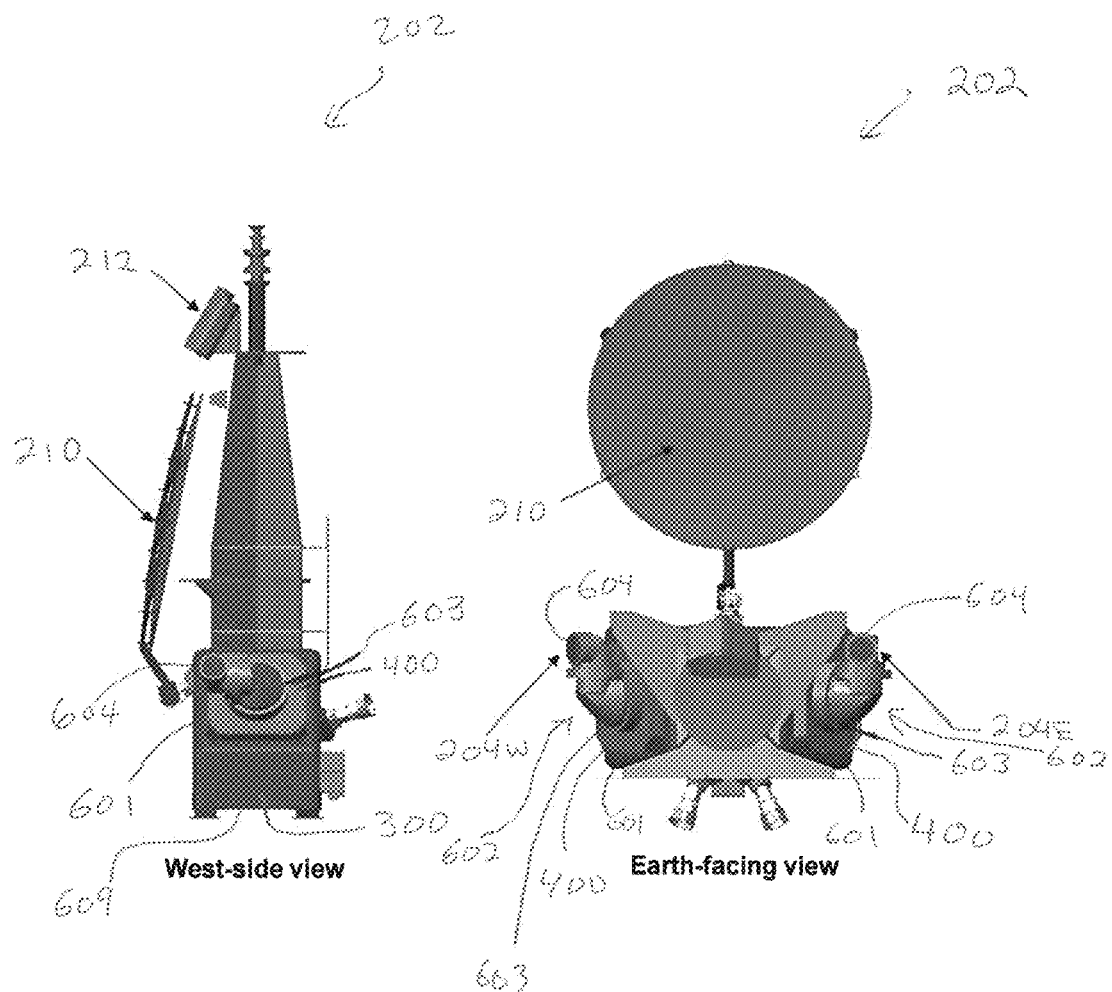
FIGS. 6A and 6B illustrate various views of an example of a hybrid communications assembly with a reflector stowed and deployed.

Returning to the example of an assembly 202 having a single RF antenna reflector 210, FIGS. 6A and 6B respectively show the assembly 202 in a west-side view with the reflector 210 stowed and in an earth-facing view with the reflector 210 deployed. Each of the LCTs 204E and 204W may include an LCT base 400 that is mounted to an angled surface 601 of the assembly base 300 (e.g., a surface of the base 300 that is disposed in a plane that is angled at an LCT mounting angle α with respect to a bottom surface 609 of the base 300 such as a surface that is parallel to the spacecraft earth deck). In one or more aspects, the LCT base 400 is disposed parallel to the angled surface 601. In one or more aspects, the angle α may be described as an angle between the angled surface 601 and the earth deck 203. In one or more aspects, the angle α may be described as an angle between the angled surface 601 and the bottom surface 609. In one or more aspects, the angle α may be described as the angle between the earth-deck normal vector and the normal to the LCT mounting interface. In one or more aspects, a minus-X axis may be an example of the earth-deck normal vector, and a perpendicular bisector 402 may be an example of the normal to the LCT mounting interface.

Referring to FIGS. 6A and 6B, each of the LCTs 204E and 204W may also include an optical port 604 that is movably mounted to its associated LCT base 400, by utilizing, for example, an LCT positioning component 602 and a mounting base 603 disposed between the optical port and the LCT base. In one example, the positioning component 602 may be rotatably mounted to the mounting base 603, which is fixed to the LCT base 400. The LCT positioning components 602 may include one or more actuatable components that are controllable to rotate the optical port 604 about two angular axes for various tracking and/or pointing operations such as for communications with a remote system. Optical port 604 may be configured to receive and/or transmit laser communications signals from and/or to one or more remote systems such as another GEO spacecraft, a LEO spacecraft, an airborne system, or a ground-based system. The structure and configuration of an LCT is not limited to those described above, and an LCT may have other structures or configurations.

As shown in FIG. 6B, the west LCT 204W may be oriented for viewing another GEO spacecraft and the east LCT 204E may be oriented for viewing a LEO spacecraft or a ground terminal. For example, the optical port 604 of the west LCT 204W is rotated such that it faces the west, and the optical port 604 of the east LCT 204E is rotated such that it faces a LEO spacecraft or the earth. The LCT FOVs can be oriented in any number of ways depending on the specific operational scenario, and the orientation will change over time as relative positions change in orbit. Both east and west LCTs 204E and 204W may be directed toward (or may face) other GEO spacecraft, or both may be directed toward the earth, or one may be directed toward the earth and one directed towards a LEO spacecraft, or any other combination.

Figures 7A, 7B:
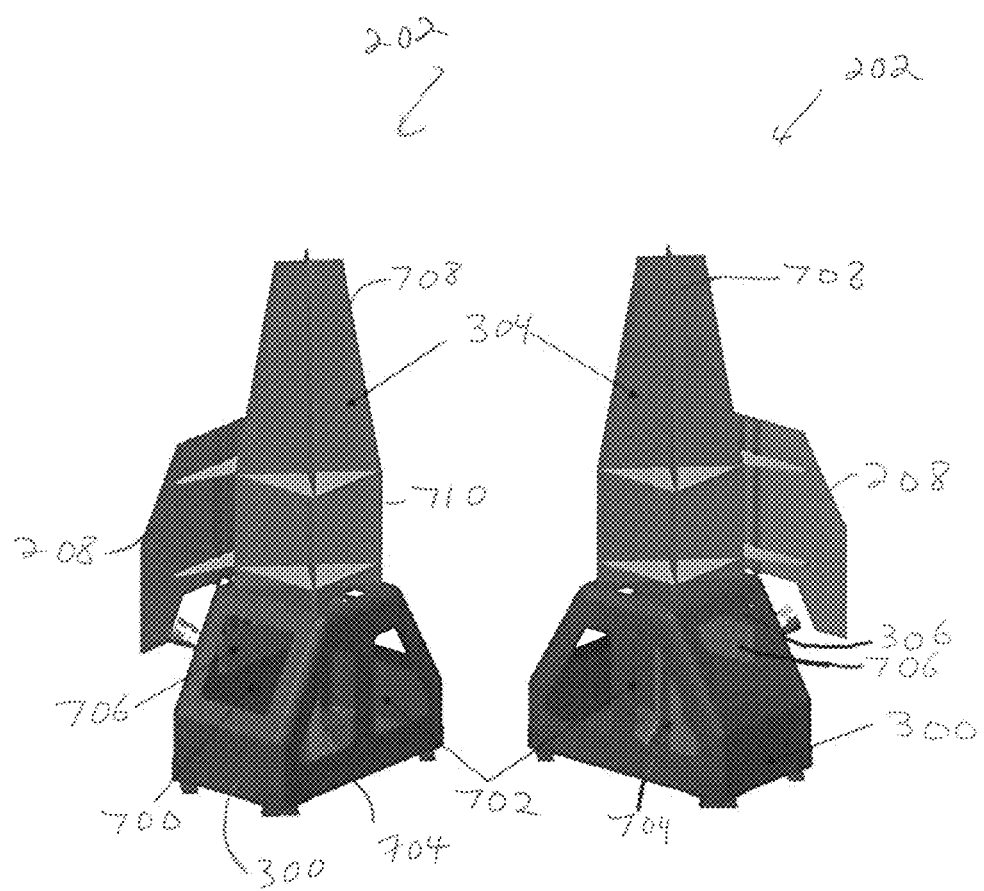
FIGS. 7A and 7B illustrate various views of an example of a hybrid communications assembly showing how an assembly base may include cutouts for LCT accommodation and access.

FIGS. 7A and 7B show examples of perspective views of the assembly 202 showing cutouts for LCT accommodation and access. The base 300 of the assembly 202 includes cutouts 700 for LCT accommodation. The base 300 also includes cutouts 702 to access waveguide or cable connections to the antennas as well as power, signal, and thermal connections to the LCTs. As shown, the tower assembly 304 may be constructed from composite flat panels 708 placed at right angles. This provides for convenient attachment of shelves 710 in one or more implementations for reflector and feed supports. Alternatively, the tower assembly 304 may use a composite cylinder construction. An internal support structure 704 is also visible in FIGS. 7A and 7B through access ports 702. A cold plate 706 mounted in a cavity within the assembly base 300 is also shown. The cold plate 706 is coupled to the radiator 208 via heat pipes 306 or other thermally conductive structures that extend from the radiator 208 (exterior to the assembly base 300) through a housing of the assembly base 300 to couple to the cold plate 706 within the cavity in the assembly base 300. The cold plate 706 may be thermally coupled to the LCTs 204E and 204W (e.g., to the LCT base 400) by one or more additional thermally conductive structures such as, for example, heat pipes or cold straps.

Figures 8A, 8B:
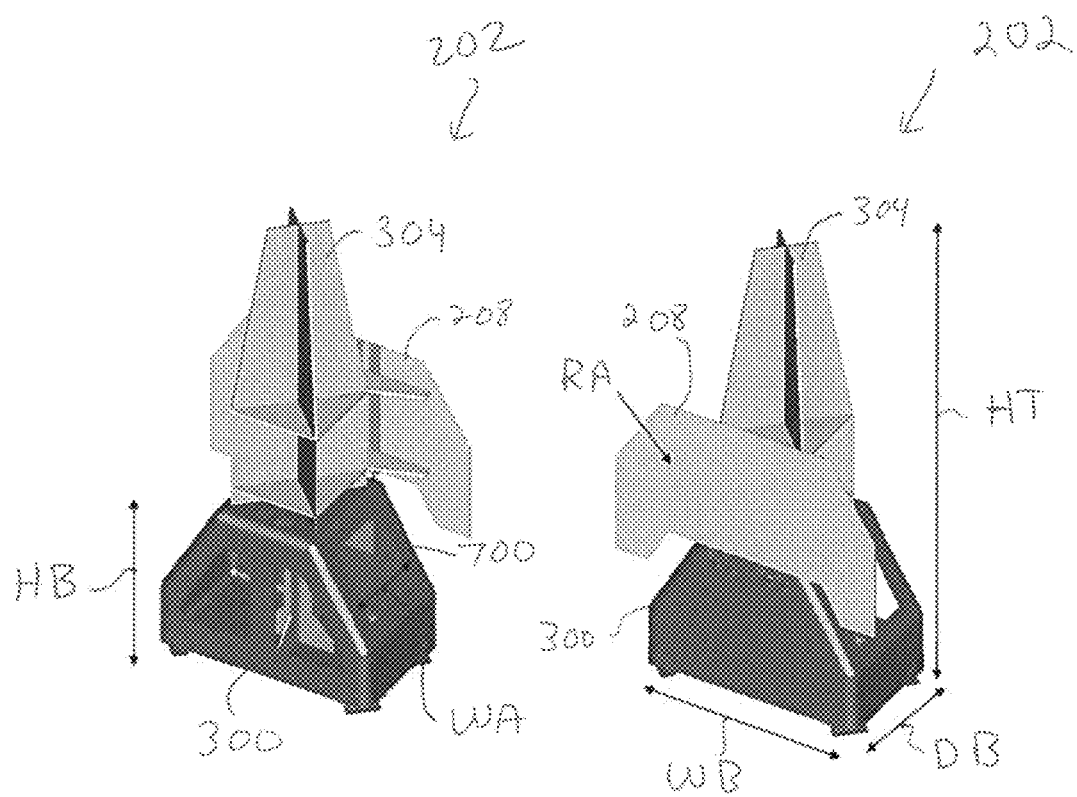
FIGS. 8A and 8B illustrate various views of a dimensioned drawing of an example of a hybrid communications assembly.

FIGS. 8A and 8B show examples of dimensioned perspective drawings of the assembly 202. In one or more implementations, the size of the assembly base and cutouts may be tailored to the specific type of LCT, based on the LCT size and volume above and below the mounting interface. The LCT cutout 700 shown in FIG. 8A is square with a width WA (e.g., a width of 0.45 m) on each side of the square. The assembly 202 may have a footprint defined by a base width WB and a base depth DB in which the larger dimension WB is along the spacecraft Y axis (east/west direction) and the shorter dimension is along the spacecraft Z axis (north/south direction) in one implementation. For example, the assembly base 300 may have a footprint of 1.3 m for WB and 0.8 m for DB. The dimensions of the assembly are constrained by the size of the earth deck on which the assembly is to be implemented, which for a spacecraft configured to launch in a 4-m fairing is about 1.8 m×2 m (as an example). The Y-axis dimension is further constrained because feeds for the east/west antennas are typically located at the edges of the earth deck (see, e.g., FIG. 5).

As shown in FIGS. 8A and 8B, the assembly base 300 may have a height HB that extends from the bottom of the assembly base 300 to the top of the assembly base 300. The assembly 202 may have a height HT that extends from the bottom of the assembly 202 to the top of the assembly 202. In one example, height HB is approximately 1.1 m, and height HT is approximately 2.8 m. The dimensions described with respect to FIGS. 8A and 8B are examples, and the dimensions of an assembly 202 are not limited to these examples.

Figures 9A, 9B:
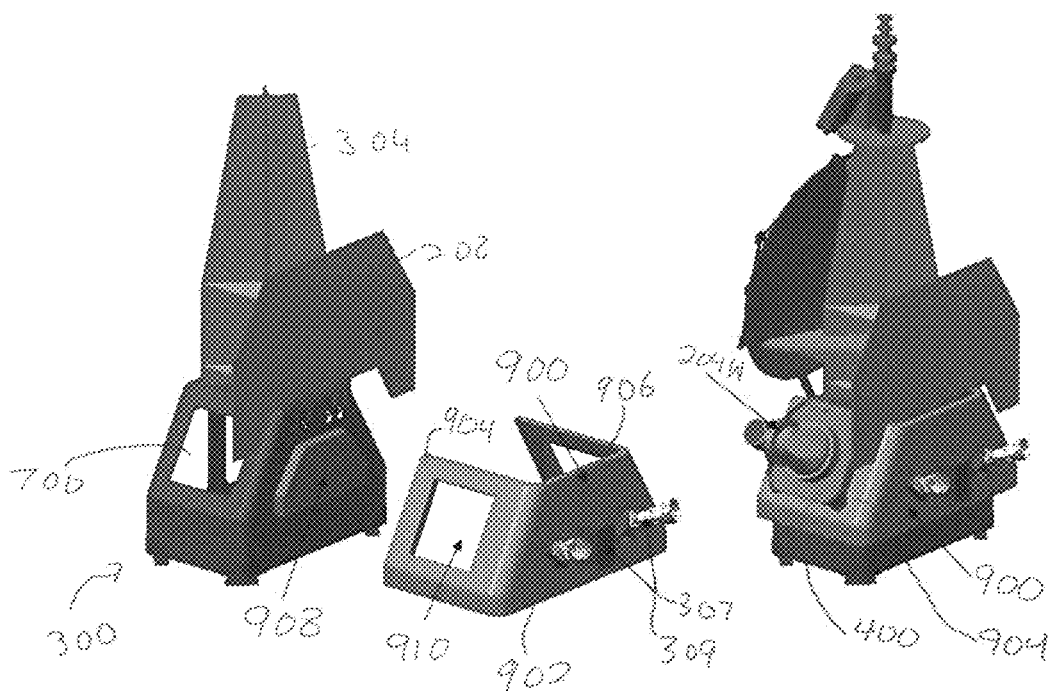
FIGS. 9A and 9B illustrate various views of an example of a hybrid communications assembly with a vibration isolated precision platform.

In some implementations, the LCTs 204E and 204W may require increased attitude knowledge accuracy and an ultra-low jitter environment to operate properly, particularly when the communications link must be established quickly, for example, in less than 20 seconds. Under such circumstances, the assembly may be modified by adding a precision platform 900 shown in the partially exploded and assembled views respectively of FIGS. 9A and 9B. As shown in FIG. 9A, the platform 900 may be configured with surfaces 902, 904, and 906 in three planes. The LCT mounting planes 904 and 906 in the example shown are angled to provide the desired LCT mounting angles, and the third plane 902, orthogonal to both LCT mounting planes 904 and 906, forms the bridge between the LCTs, where the bridge supports the star trackers 307 and the IMU 309 attached to the platform in one or more implementations. Each LCT mounting plane may include a mounting plane LCT cutout 910 configured to align with the corresponding LCT cutout 700 of the base 300.

The platform 900 may be a composite structure designed for thermal stability and with stiffness such that the motion sensed by the attitude sensors matches the LCT interface up to a specified frequency. In this way, the sensor data can provide a more accurate representation of LCT pointing. In particular, the motion sensed by the IMU 309 can be used by the LCT to cancel the effects of interface jitter. The precision platform 900 may attach to the assembly base 300 through a vibration isolation mount 908 that may be of various designs. For example, the mount 908 may include multiple feet composed of an elastomer material, or may comprise isolation struts with tuned damping and stiffness (not shown). As illustrated in FIG. 9B, LCTs (such as the LCT 204W) may be attached to the platform 900, which is attached to the assembly base 300. In other implementations as described above in connection with, for example, FIGS. 2A through 8B, LCTs 204E and 204W may be mounted directly on the assembly base 300.

Other implementations will be evident to those with skill in the art. For example, the assembly base 300 may be provided for mounting the LCTs 204E and 204W without the antenna tower 304. With this arrangement, antennas may be mounted, for example, directly to the top (on the earth-facing side) of the assembly base. This may be preferable when the antennas are small, e.g., antennas for commanding and telemetry. Alternatively, a third LCT may be mounted to the top of the assembly base to enable three simultaneous connections, for example simultaneous connections to two GEO spacecraft and one ground terminal or one LEO spacecraft. In one or more implementations, an assembly base may refer to a structure that includes an assembly base as well as a tower assembly. In one or more implementations, an assembly base and a tower assembly may be of a unitary structure.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these aspects will be readily apparent to those skilled in the art, and generic principles defined herein may be applied to other aspects. Thus, many changes and modifications may be made to the subject technology, by one having ordinary skill in the art, without departing from the scope of the subject technology.

In one or more aspects, one or more configurations or components shown in one figure may be utilized with one or more other configurations or components shown in one or more other figures. For example, multiple RF antennas (e.g., multiple antenna feeds with multiple corresponding RF reflectors) may be utilized with respect to any of FIGS. 2A through 9B. In one or more examples, the configuration shown in FIGS. 9A and 9B may be utilized with respect to any of FIGS. 2A through 8B.

Like reference numerals may designate like elements. For example, same reference numerals 202, 204E, 204W, 206, 208, 210, 212, 300, 304, 306, 307, 309, 400, and 700 are used in various figures for simplicity and convenience. These components with the same reference numerals have certain characteristics that are the same, but as different figures illustrate different examples, the same reference numeral does not indicate that a component with the same reference numeral has the exact same characteristics. While the same reference numerals are used for certain components, examples of differences with respect to a component are described throughout this disclosure.

It is understood that the specific order or hierarchy of steps in the processes disclosed is an illustration of exemplifying approaches. Based upon design preferences, it is understood that the specific order or hierarchy of steps in the processes may be rearranged. Some of the steps may be performed simultaneously.

It is noted that dimensional aspects (e.g., height, width) provided above are examples and that other values for the dimensions can be utilized in accordance with one or more implementations. Furthermore, the dimensional aspects provided above are generally nominal values. As would be appreciated by a person skilled in the art, each dimensional aspect has a tolerance associated with the dimensional aspect.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" means "serving as an example or illustration." Any aspect or design described herein as "exemplary" is not necessarily to be construed as preferred or advantageous over other aspects or designs. A reference to an element in the singular is not intended to mean "one and only one" unless specifically stated, but rather "one or more." The term "some" refers to one or more. The term "example" is sometimes used a noun and sometimes used as an adjective.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include", "have", or the like is used in the description or the claims, such term is intended to be inclusive in a manner similar to the term "comprise" as "comprise" is interpreted when employed as a transitional word in a claim.

What is claimed is:

1. A spacecraft, comprising:
a body having an earth deck;
one or more solar panels mounted to one or more sides of the body; and
a hybrid communications assembly mounted to the earth deck, the hybrid communications assembly comprising:
an assembly base having one or more angled mounting surfaces, each fixedly disposed at an angle between 50 degrees and 70 degrees with respect to the earth deck;
one or more laser communications terminals each mounted to a corresponding one of the angled mounting surfaces of the assembly base, each of the one or more laser communications terminals comprising an optical port;
an antenna tower mounted to a surface of the assembly base that is parallel to the earth deck and adjacent to at least one of the angled mounting surfaces; and
a radio frequency antenna system comprising an antenna feed mounted to the antenna tower and a deployable antenna reflector mounted directly to the assembly base and configured to prevent obstructing an operation of the optical ports.

2. The spacecraft of claim 1, wherein the hybrid communications assembly further comprises a thermal radiator mounted to the assembly base and thermally coupled to the one or more laser communications terminals.

3. The spacecraft of claim 2, further comprising a cold plate thermally coupled to the one or more laser communications terminals and mounted in a cavity within the assembly base, wherein the cold plate is coupled to the thermal radiator via a heat pipe that extends from the thermal radiator through a housing of the assembly base to couple the thermal radiator to the cold plate within the cavity in the assembly base.

4. The spacecraft of claim 1, wherein the one or more angled mounting surfaces include two angled mounting surfaces disposed on opposing sides of the surface of the assembly base that is parallel to the earth deck, wherein the one or more laser communications terminals comprise two laser communications terminals each mounted to a corresponding one of the two angled mounting surfaces, and wherein the deployable antenna reflector is located substantially between the two laser communications terminals and is configured to deploy without interfering with the operation of the optical ports.

5. The spacecraft of claim 4, further comprising:
a plurality of additional antenna reflectors mounted to the body, wherein the plurality of additional antenna reflectors and the one or more solar panels are configured to deploy without obstructing an operation of the optical ports.

6. The spacecraft of claim 1, wherein the hybrid communications assembly comprises a plurality of mounting feet that attach the assembly base to the earth deck.

* * * * *